US012603973B2

(12) United States Patent
Allam et al.

(10) Patent No.: US 12,603,973 B2
(45) Date of Patent: Apr. 14, 2026

(54) HOST SATELLITE HAVING PRIORITIZED ANALYTICS ASSOCIATED WITH DETECTED OBJECTS AND MISSION CONSTRAINTS FOR COMMUNICATION WITH CLIENT TERMINAL

(71) Applicant: Sidus Space, Inc., Merritt Island, FL (US)

(72) Inventors: Jeremy Joseph Allam, Los Angeles, CA (US); Marcel Romeo Lariviere, Pasadena, CA (US)

(73) Assignee: Sidus Space, Inc., Cape Canaveral, FL (US)

( * ) Notice: Subject to any disclaimer, the term of this patent is extended or adjusted under 35 U.S.C. 154(b) by 523 days.

(21) Appl. No.: 18/175,977

(22) Filed: Feb. 28, 2023

(65) Prior Publication Data

US 2023/0283751 A1     Sep. 7, 2023

Related U.S. Application Data

(60) Provisional application No. 63/315,461, filed on Mar. 1, 2022.

(51) Int. Cl.
  *H04N 7/18* (2006.01)
  *G06V 10/94* (2022.01)
  (Continued)

(52) U.S. Cl.
  CPC ............. *H04N 7/181* (2013.01); *G06V 10/95* (2022.01); *G06V 20/13* (2022.01);
  (Continued)

(58) Field of Classification Search
  CPC ........ H04N 7/181; H04N 23/61; H04N 7/185; G06V 10/95; G06V 20/13; H04B 7/18515; H04B 7/18584
  See application file for complete search history.

(56) References Cited

U.S. PATENT DOCUMENTS

2023/0231699 A1* 7/2023 Richarte ............ H04L 63/0428
                                                        713/170

OTHER PUBLICATIONS

Willburger, K., Schwenk, K. and Brauchle, J., 2020. Amaro-an on-board ship detection and real-time information system. Sensors, 20(5), p. 1324.*

(Continued)

*Primary Examiner* — Zhitong Chen
(74) *Attorney, Agent, or Firm* — Widerman Malek, PL; Mark Malek

(57) ABSTRACT

A host satellite comprises a first memory segment for storing a mission operation lookup table having at least one mission operation identifier associated with mission parameter constraints, a target object type and object detection model parameters associated with the target object type. A first sensor provides satellite sensor data that represents orbital mission characteristics. A second sensor captures images. A mission operation selector is responsive to the orbital mission characteristics and the mission parameter constraints for selecting the at least one mission operation identifier. An object detector is responsive to the captured images and the object detection model parameters associated with the selected mission operation identifier for detecting objects from the captured images. An analytics generator is responsive to the detected objects, the orbital mission characteristics, and the mission operation identifier for creating a mission analytics packet. A communication interface transfers the mission analytics packet to the client terminal.

20 Claims, 6 Drawing Sheets

(51) Int. Cl.
    *G06V 20/13*      (2022.01)
    *H04B 7/185*     (2006.01)
    *H04N 23/61*    (2023.01)

(52) U.S. Cl.
    CPC ..... *H04B 7/18515* (2013.01); *H04B 7/18584* (2013.01); *H04N 23/61* (2023.01)

(56)            References Cited

OTHER PUBLICATIONS

Kodheli, O., Lagunas, E., Maturo, N., Sharma, S.K., Shankar, B., Montoya, J.F.M., Duncan, J.C.M., Spano, D., Chatzinotas, S., Kisseleff, S. and Querol, J., 2020. Satellite communications in the new space era: A survey and future challenges. IEEE Communications Surveys & Tutorials, 23(1), pp. 70-109.*

Hassanien, A.E., Darwish, A. and Abdelghafar, S., 2020. Machine learning in telemetry data mining of space mission: basics, challenging and future directions. Artificial Intelligence Review, 53(5), pp. 3201-3230.*

\* cited by examiner

Mission Operation
Identifier Memory Segment 102

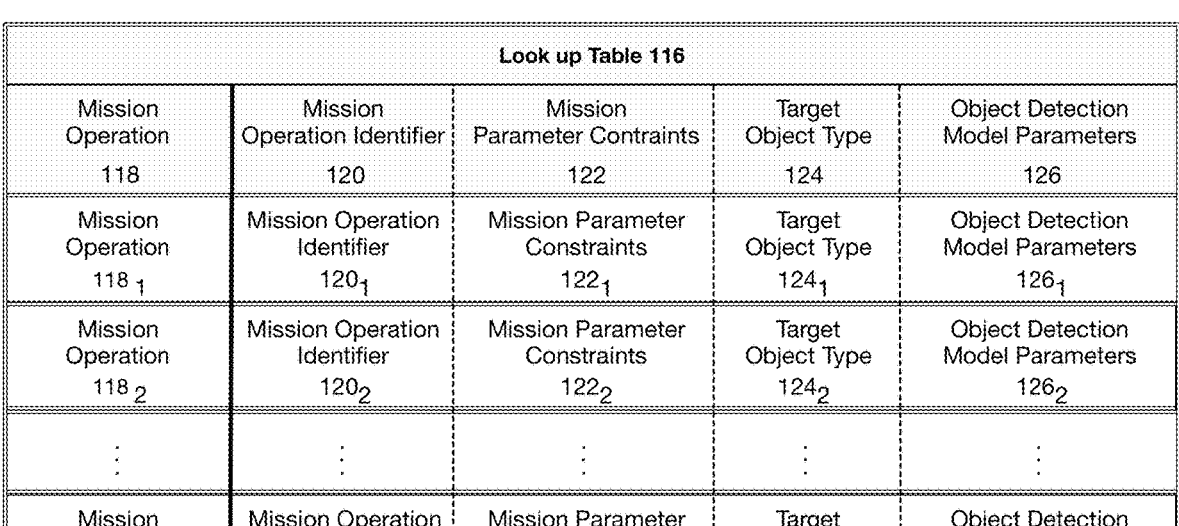

| Look up Table 116 | | | | |
|---|---|---|---|---|
| Mission Operation 118 | Mission Operation Identifier 120 | Mission Parameter Contraints 122 | Target Object Type 124 | Object Detection Model Parameters 126 |
| Mission Operation $118_1$ | Mission Operation Identifier $120_1$ | Mission Parameter Constraints $122_1$ | Target Object Type $124_1$ | Object Detection Model Parameters $126_1$ |
| Mission Operation $118_2$ | Mission Operation Identifier $120_2$ | Mission Parameter Constraints $122_2$ | Target Object Type $124_2$ | Object Detection Model Parameters $126_2$ |
| ⋮ | ⋮ | ⋮ | ⋮ | ⋮ |
| Mission Operation $118_N$ | Mission Operation Identifier $120_N$ | Mission Parameter Constraints $122_N$ | Target Object Type $124_N$ | Object Detection Model Parameters $126_N$ |

FIG. 2

Mission Analytics Priority Packet
Memory Segment 142

| Look up Table 150 | | |
|---|---|---|
| Mission Analytics Priority Packet 135 | Mission Packet Identifier 138 | Mission Priority Characteristics 140 |
| Mission Analytics Priority Packet $135_1$ | Mission Packet Identifier $138_1$ | Mission Priority Characteristics $140_1$ |
| Mission Analytics Priority Packet $135_2$ | Mission Packet Identifier $138_2$ | Mission Priority Characteristics $140_2$ |
| ⋮ | ⋮ | ⋮ |
| Mission Analytics Priority Packet $135_N$ | Mission Packet Identifier $138_N$ | Mission Priority Characteristics $140_N$ |

FIG. 3

Mission Analytics Packet
Catalogue Memory Segment 144

| Packet Catalogue 152 | | | | | |
|---|---|---|---|---|---|
| Mission Analytics Packet 134 | Mission Packet Identifier 138 | Mission Operation Identifier 120 | Detected Objects 132 | Orbital Mission Characteristics 128 | Captured Images 130 |
| Mission Analytics Packet $134_1$ | Mission Packet Identifier $138_1$ | Mission Operation Identifier $120_1$ | Detected Objects $132_1$ | Orbital Mission Characteristics $128_1$ | Captured Images $130_1$ |
| Mission Analytics Packet $134_2$ | Mission Packet Identifier $138_2$ | Mission Operation Identifier $120_2$ | Detected Objects $132_2$ | Orbital Mission Characteristics $128_2$ | Captured Images $130_2$ |
| ⋮ | ⋮ | ⋮ | ⋮ | ⋮ | ⋮ |
| Mission Analytics Packet $134_N$ | Mission Packet Identifier $138_N$ | Mission Operation Identifier $120_N$ | Detected Objects $132_N$ | Orbital Mission Characteristics $128_N$ | Captured Images $130_N$ |

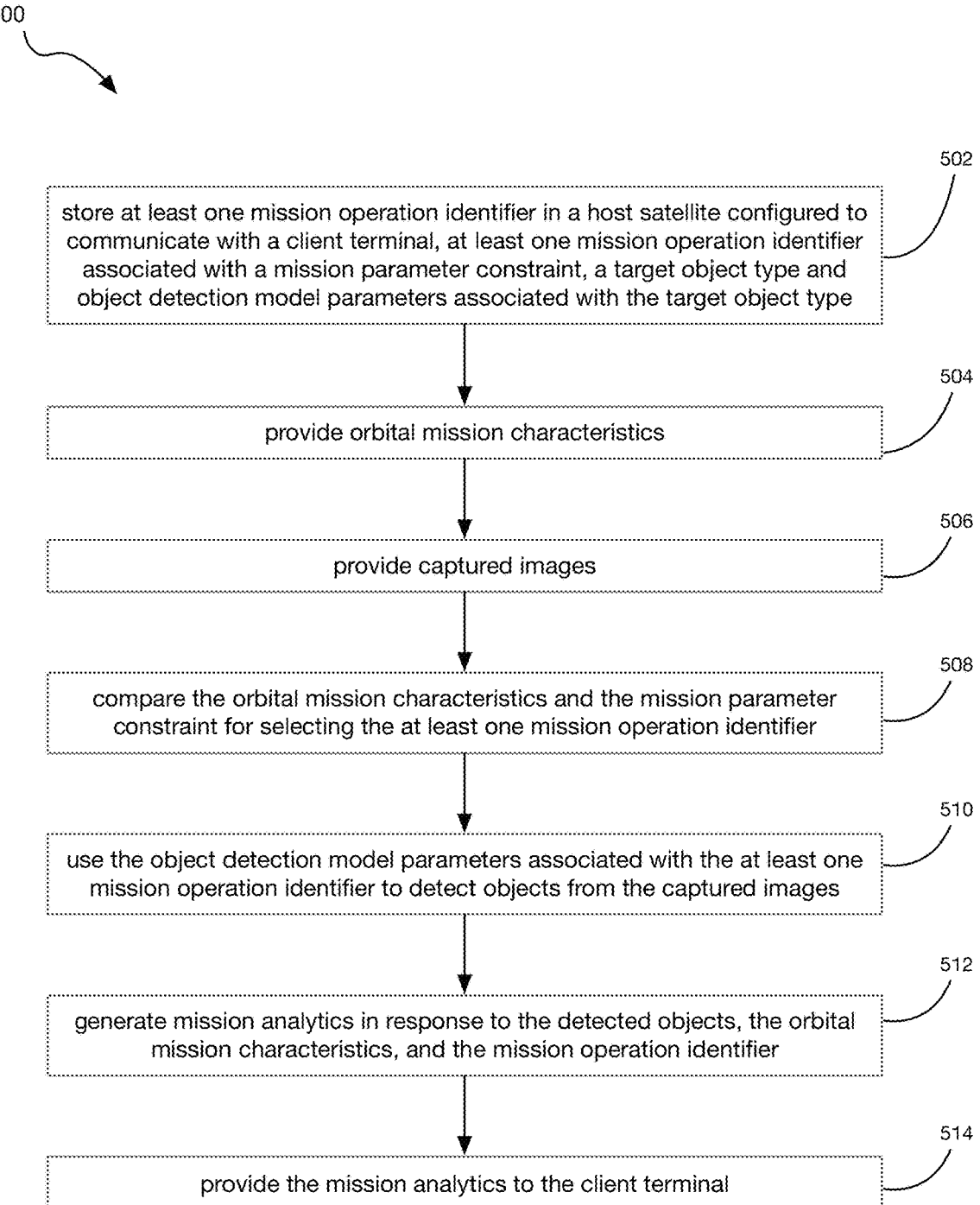

502 store at least one mission operation identifier in a host satellite configured to communicate with a client terminal, at least one mission operation identifier associated with a mission parameter constraint, a target object type and object detection model parameters associated with the target object type

504 provide orbital mission characteristics

506 provide captured images

508 compare the orbital mission characteristics and the mission parameter constraint for selecting the at least one mission operation identifier

510 use the object detection model parameters associated with the at least one mission operation identifier to detect objects from the captured images

512 generate mission analytics in response to the detected objects, the orbital mission characteristics, and the mission operation identifier

514 provide the mission analytics to the client terminal

FIG. 5

Cube Satelite 602

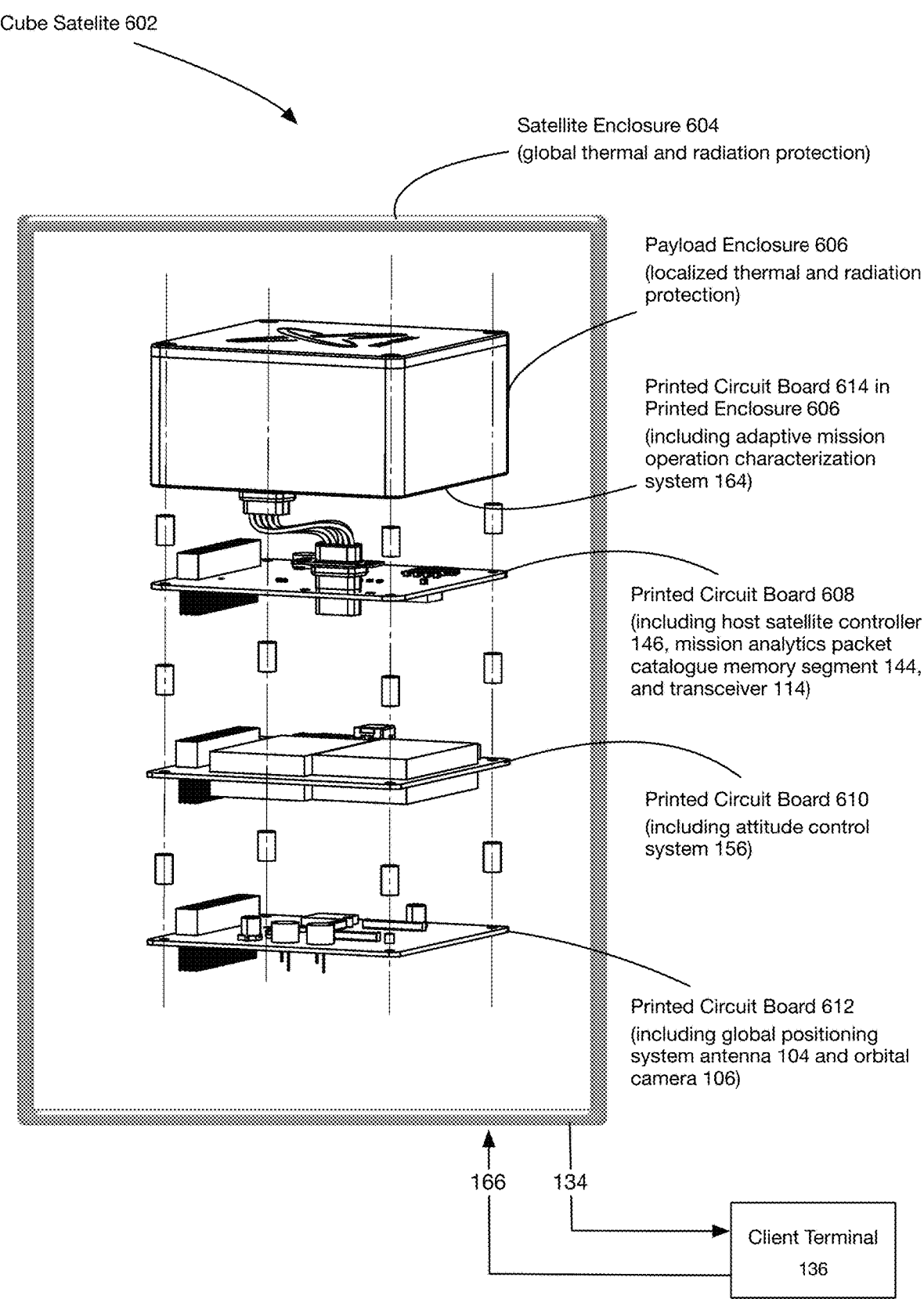

Satellite Enclosure 604
(global thermal and radiation protection)

Payload Enclosure 606
(localized thermal and radiation protection)

Printed Circuit Board 614 in Printed Enclosure 606
(including adaptive mission operation characterization system 164)

Printed Circuit Board 608
(including host satellite controller 146, mission analytics packet catalogue memory segment 144, and transceiver 114)

Printed Circuit Board 610
(including attitude control system 156)

Printed Circuit Board 612
(including global positioning system antenna 104 and orbital camera 106)

166      134

Client Terminal
136

FIG. 6

Payload Enclosure 606
(localized thermal and radiation protection)

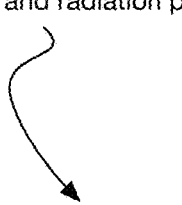

Local Thermal Heat Sink 702
(removes excess heat during hot state)

Printed Circuit Board 614
(including adaptive mission operation
characterization system 164)

Local Radiation Shielding 706
(shields local electronics from
radiation effects)

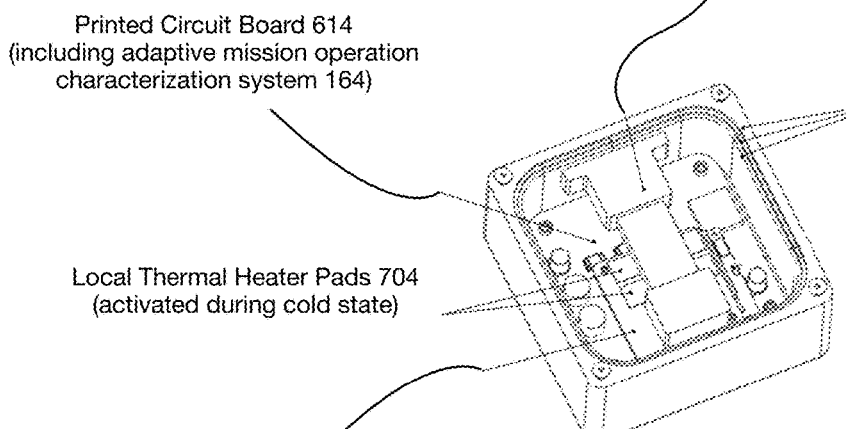

Local Thermal Heater Pads 704
(activated during cold state)

Object Detector 110 on Printed Circuit Board 614
(electronics generate local heat source)

FIG. 7

HOST SATELLITE HAVING PRIORITIZED ANALYTICS ASSOCIATED WITH DETECTED OBJECTS AND MISSION CONSTRAINTS FOR COMMUNICATION WITH CLIENT TERMINAL

CROSS-REFERENCE TO RELATED APPLICATION

The present application claims priority to U.S. Provisional Application No. 63/315,461 entitled HOST SATELLITE HAVING PRIORITIZED ANALYTICS ASSOCIATED WITH DETECTED OBJECTS AND MISSION CONSTRAINTS FOR COMMUNICATION WITH CLIENT TERMINAL filed on Mar. 1, 2022, the entirety of which is hereby incorporated by reference.

TECHNICAL FIELD

This specification relates to satellites that collect data on orbit.

BACKGROUND

Satellites in orbit capture and transmit over 10 million raw photos consuming over 100 terabytes of data transfer bandwidth per day down to Earth. Furthermore, it can take hours from the time a raw photo is captured by a satellite, delivered to the ground, and processed to extract analytics before the extracted analytics are transmitted to the end user. This delay in obtaining the extracted analytics data from a raw photo, also known as latency, can impact effective decision-making for commercial, regulatory, or environmental conditions such as the ability to effectively prevent a small wildfire or oil leak from growing into a large, catastrophic environmental event.

DESCRIPTION OF DRAWINGS

FIG. 2 illustrates an embodiment of the lookup table in the mission operation identifier memory segment of FIG. 1.

FIG. 3 illustrates an embodiment of the lookup table in the mission analytics packet priority memory segment of FIG. 1.

FIG. 4 illustrates an embodiment of the packet catalogue in the mission analytics packet catalogue memory segment of FIG. 1.

FIG. 5 illustrates a method of generating orbital mission analytics for transmission from a host satellite to a client terminal.

FIG. 6 illustrates a cube satellite with stacked circuit board subsystems and an integrated payload enclosure implementing an embodiment of the adaptive mission operation characterization system of FIG. 1.

FIG. 7 illustrates a thermal and radiation structure for the payload enclosure of FIG. 6.

Like reference symbols in the various figures indicate like elements.

DETAILED DESCRIPTION

Figure 1:
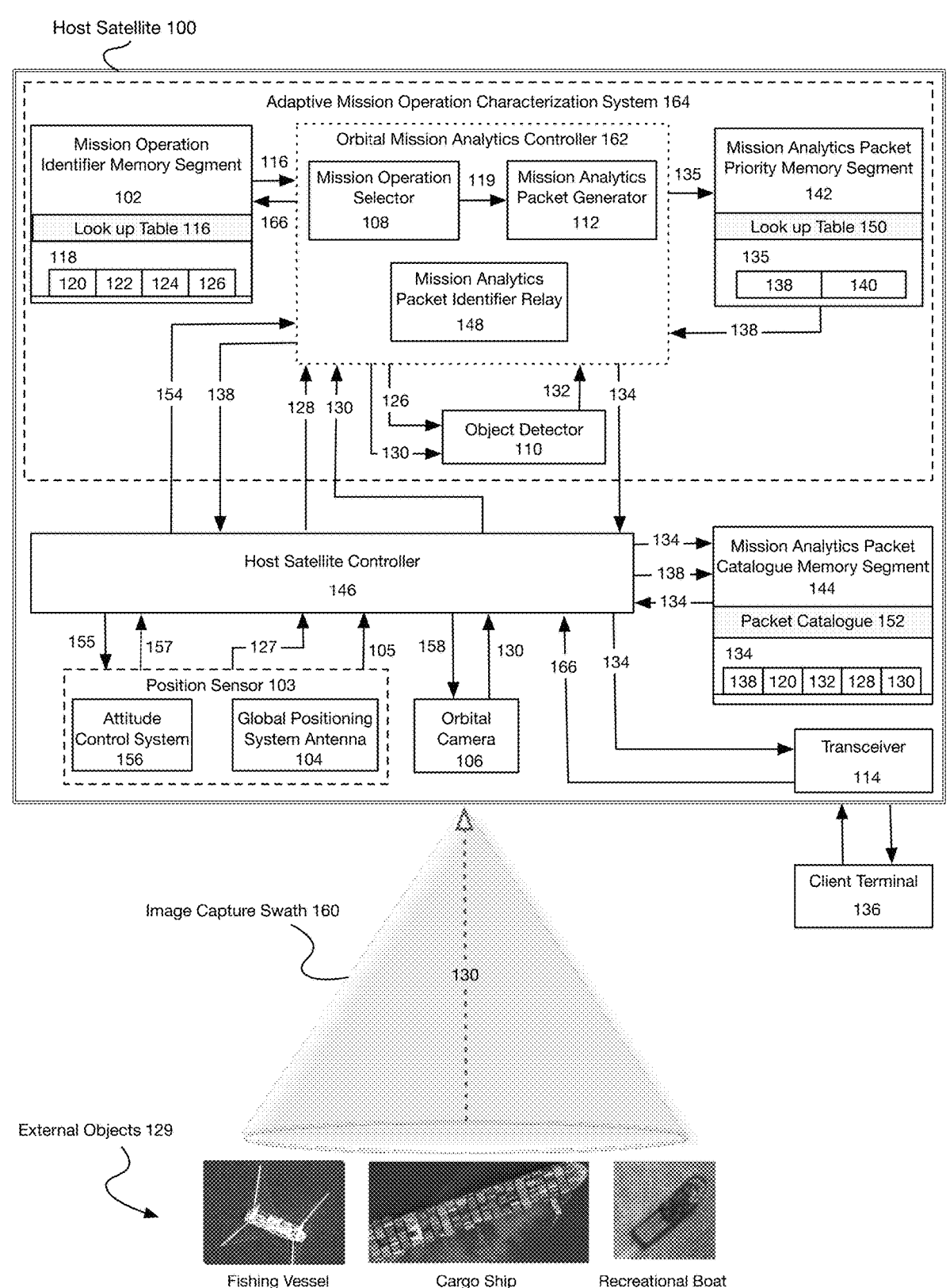
FIG. 1 illustrates a host satellite with an analytics generator responsive to detected objects, orbital mission characteristics, and a mission operation identifier for creating and sending a mission analytics packet to a client terminal.

Referring to FIG. 1, a host satellite 100 according to one embodiment includes a first memory segment such as mission operation identifier memory segment 102, a first sensor such as a position sensor 103, a second sensor such as orbital camera 106, a mission operation selector 108, an object detector 110, an analytic generator such as mission analytics packet generator 112, and a communication interface such as transceiver 114.

The mission operation identifier memory segment 102 stores a mission operation lookup table 116 that includes at least one mission operation 118 having a mission operation identifier 120 associated with mission parameter constraints 122, a target object type 124 and object detection model parameters 126 associated with the target object type 124.

In one embodiment, the position sensor 103 provides satellite sensor data 127 that represents orbital mission characteristics 128. The satellite sensor data 127 may represent satellite telemetry data. The orbital camera 106 captures images 130. The mission operation selector 108 is responsive to the orbital mission characteristics 128 and the mission parameter constraints 122 for selecting the mission operation identifier 120 associated with the mission parameter constraints 122 for the at least one mission operation 118. The object detector 110 is responsive to the captured images 130 and the object detection model parameters 126 associated with the selected mission operation identifier 120 for detecting objects 132 from the captured images 130. The detected objects 132 having an object classification associated with the target object type 124.

The mission analytics packet generator 112 is responsive to the detected objects 132, the orbital mission characteristics 128, and the mission operation identifier 120 for creating a mission analytics packet 134. The transceiver 114 transfers the mission analytics packet 134 to a client terminal 136.

In one embodiment, the mission analytics packet generator 112 may create mission analytics priority packet 135 associated with the mission analytics packet 134. The mission analytics priority packet 135 includes the mission packet identifier 138 and mission priority characteristics 140. For example, the mission priority characteristics 140 is based on the mission parameter constraints 122 for the mission packet identifier 138 and the orbital mission characteristics 128.

The host satellite 100 may include a second memory segment such as a mission analytics packet priority memory segment 142, a third memory segment such as a mission analytics packet catalogue memory segment 144, a host satellite controller 146, and a mission analytics packet identifier relay 148. The mission analytics packet priority memory segment 142 may store a mission analytics lookup table 150 that includes the mission packet identifiers 138 and the mission priority characteristics 140. The mission analytics packet catalogue memory segment 144 may store a mission analytics packet catalogue 152 that includes each mission analytics packet 134 associated with the mission operation identifier 120 selected by the mission operation selector 108. In one embodiment, each mission analytics packet 134 includes the packet mission identifier 138, the mission operation identifier 120, the detected objects 132, the orbital mission characteristics 128, and the captured images 130. Alternatively, the captured images 130 may be omitted from the mission analytics packet 134.

The host satellite controller 146 may provide a packet identifier request 154, and the mission analytics packet identifier relay 148 is responsive to the packet identifier request 154 for providing at least one of the mission packet identifiers 138 to the host satellite controller 146. The host satellite controller 146 is responsive to the mission packet identifiers 138 for selecting one of the mission analytics packets 134 from the mission analytics packet catalogue 152.

The at least one mission operation 118 may be an application-specific mission operation. In one embodiment, (a) the client terminal 136 may be a terrestrial ground station, (b) the mission parameter constraints 122 may represent terrestrial mission parameter constraints, and (c) the application-specific mission operation is for monitoring target object 124 (such as methane leaks, oil spills, wildfire and flood hazards, unauthorized fishing, mining, or wood-cutting, or railway system integrity and malfunctions) when the terrestrial mission parameter constraints satisfy orbital mission characteristics 128. According to another embodiment, (a) the client terminal 136 may be a client satellite, (b) the mission parameter constraints 122 may represent an orbital mission parameter constraints, and (c) the application-specific mission operation is for monitoring target object 124 (such as rendezvous and proximity operations and docking (RPOD) and orbital servicing including refueling, assembly and manufacturing (OSAM)) when the terrestrial mission parameter constraints satisfy orbital mission characteristics 128.

The orbital mission characteristics 128 may include satellite telemetry data (such as provided by sensor signal 127) for inclination, right ascension of ascending node, eccentricity, argument of perigee, mean anomaly, and mean motion. Position sensor 103 may include a global position system antenna 104 and an attitude control system 156 that provides the satellite telemetry data. The global position system antenna 104 may provide position signal 105 representing three-dimensional coordinate location with time stamps. The attitude control system 156 may be responsive to attitude command signal 155 from the host satellite controller 146 (based on position signal 105) for pointing the host satellite 100 in a direction that satisfies the mission parameter constraints 122. The attitude control system 156 may provide an attitude pointing signal 157 to the host satellite controller 146 for updating the host satellite pointing information.

The orbital camera 106 may have an image capture command 158 and the captured images 130 are within the image capture swath 160. The captured images 130 may be asynchronously provided in response to the orbital camera 106 receiving a capture command 158 independent from the mission parameter constraints 122 to create a library of captured images. Alternatively, the captured images 130 may be synchronously provided in response to the orbital camera 106 receiving the capture command 158 depending on the mission parameter constraints 122. For example, the capture command 158 is provided when the orbital mission characteristics 128 satisfy the mission parameter constraints 122.

In one embodiment, host satellite 100 includes an orbital mission analytics controller 162 connected to the object detector 110, the host satellite controller 146, the mission operation identifier memory segment 102, and the mission analytics packet priority memory segment 142. The host satellite controller 146 includes the mission operation selector 108, the mission analytics packet generator 112, and the mission analytics packet identifier 148. According to another embodiment, host satellite 100 includes an adaptive mission operation characterization system 164 connected to the host satellite controller 146. The adaptive mission operation characterization system 164 includes the orbital mission analytics controller 162, the object detector 110, the mission operation identifier memory segment 102, and the mission analytics packet priority memory segment 142.

According to one embodiment, the adaptive mission operation characterization system 164 may perform a tip and cue process for the host satellite 100 to generate attitude command signal 155 and image capture command 158 based on each mission analytics packet 134. Accordingly, the host satellite 100 is adapted to point the orbital camera 106 to capture images of external objects 129 in regions of interest that may be determined from each mission analytics packet 134.

FIG. 2 illustrates an embodiment of the lookup table 116 in the mission operation identifier memory segment 102 of FIG. 1. The lookup table 116 includes a set of mission operations $118_1$ to $118_N$, mission operation identifiers $120_1$ to $120_N$, mission parameter constraints $122_1$ to $122_N$, target object types $124_1$ to $124_N$, and object detection model parameters $126_1$ to $126_N$.

Each mission operation $118_n$ has a mission operation identifier $120_n$ associated with a mission parameter constraints $122_n$, a target object type $124_n$ and object detection model parameters $126_n$ for the target object type $124_n$, where n is the $n^{th}$ mission operation in the set of application-specific mission operations $118_1$ to $118_N$. The mission parameter constraints $122_n$ provide conditions (such as satellite orbital location, region of interest, and time of day) for satisfying the orbital mission characteristics 128 before the object detector 110 is configured with the object detection model parameters $126_n$ to detect object from the captured images 130 of external objects 129. The detected objects have an object classification associated with target object type $124_n$.

In one embodiment, lookup table 116 may be updated to add or edit any of mission operations $118_1$ to $118_N$. The client terminal 136 may provide a command 166 to host satellite 100 for updating lookup table 116. Command 166 may also provide instructions from client terminal 136 to prioritize mission operations or request a mission analytics packet.

For example, mission operation $118_n$ may represent a fire detection mission when mission parameter constraints $122_n$ satisfy orbital mission characteristics 128. Mission operation $118_{n+1}$ may represent an unauthorized fishing vessel detection mission when mission parameter constraints $122_{n+1}$ satisfy orbital mission characteristics 128. Mission operation $118_{n+2}$ may represent an RPOD mission for tracking an incoming satellite during a docking and refueling maneuver when mission parameter constraints $122_{n+2}$ satisfy orbital mission characteristics 128.

FIG. 3 illustrates an embodiment of the lookup table 150 in the mission analytics packet priority memory segment 142 of FIG. 1. The lookup table 150 includes a set of mission packet identifiers $138_1$ to $138_N$ associated with a set of mission priority characteristics $140_1$ to $140_N$.

FIG. 4 illustrates an embodiment of the mission analytics packet catalogue 152 of mission analytics packet catalogue memory segment 144 of FIG. 1. The mission analytics packet catalogue 152 includes a set of mission analytics packets 1341 to 134N associated with the set of mission packet identifiers $138_1$ to $138_N$, the set of mission operation identifiers $120_1$ to $120_N$, a set of detected objects 1321 to 132N, a set of orbital mission characteristics $128_1$ to $128_N$, and a set of captured images $130_1$ to $130_N$.

For example, the orbital mission characteristics 128 may include telemetry data such as name and mission characteristics including attitude control system (ACS), global positioning system (GPS), start time, end time, duration, operation dates, camera peripheral device data (e.g., synthetic aperture radar (SAR), hyper spectral, multispectral, red-green-blue (RGB), ground sample distance (GSD), resolution, etc), satellite operation health and status, and frequency of operations. Also, the telemetry data may include number of captured images, the captured images, the frame rate for captured images, the image resolution (pixels), the time stamp, and weather conditions. The telemetry data may also include target captured image analytics (e.g., priority, trends, density, size, speed, direction, AI analytics/predictions), frame rate for captured images, image resolution (e.g., pixels), time stamp, and weather conditions.

In one embodiment, memory segments 102, 142, and 144 are non-volatile memory. Memory segments 102, 142, and 144 may be located on separate memory devices or integrated in any combination on the same memory device. Also, each of memory segments 102, 142, and 144 may be located on a memory device in the adaptive mission operation characterization system 164.

FIG. 5 illustrates a method of generating orbital mission analytics for communication from a host satellite to a client terminal. The method includes a step 502 that stores at least one mission operation identifier in the host satellite, the at least one mission operation identifier being associated with mission parameter constraints, a target object type and object detection model parameters associated with the target object type. Step 504 provides orbital mission characteristics and step 506 provides captured images. Step 508 compares the orbital mission characteristics and the mission parameter constraints for selecting the at least one mission operation identifier. Step 510 uses the object detection model parameters associated with the at least one mission operation identifier to detect objects from the captured images. Step 512 generates mission analytics in response to the detected objects, the orbital mission characteristics, and the mission operation identifier. Step 514 provides the mission analytics to the client terminal.

FIG. 6 illustrates the host satellite 100 of FIG. 1 configured as a cube satellite 602 having a satellite enclosure 604 with payload enclosure 606 stacked with printed circuit board subsystems 608, 610, and 612. Printed circuit board subsystems 608, 610, and 612 include the components shown in host satellite 100, except the adaptive mission operation characterization system 164. For example, the circuit board subsystem 608 may include the host satellite controller 146 and mission analytics packet catalogue memory segment 144; the circuit board subsystem 610 may include the attitude control system 156; and the circuit board subsystem 612 may include the global positioning system antenna 104 and the orbital camera 106. Payload enclosure 606 includes a printed circuit board 614 having the adaptive mission operation characterization system 164 of FIG. 1. Also, the satellite enclosure 604 includes a global thermal and radiation protection structure that provides first level protection for components in the satellite enclosure 604. The payload enclosure 606 includes a localized thermal and radiation protection structure that provides second level protection for electronics such as the object detector 110 on the adaptive mission operation characterization system 164. In one embodiment, the payload enclosure 606 has a form factor and interface that satisfies printed circuit board form factor and interface requirements for the satellite enclosure 604.

FIG. 7 illustrates an active thermal and radiation structure for the payload enclosure 606 of FIG. 6, according to one embodiment. Payload enclosure 606 includes printed circuit board 614 with the adaptive mission operation characterization system 164 of FIG. 1, a local thermal heat sink 702, a local thermal heater pads 704, and a local radiation shield 706. While in orbit, the local thermal heat sink 702 removes excess heat (such as resistive heating) generated from electronics such as object detector 110 on the printed circuit board 614, as well as removes excess solar radiation. Local thermal heater pads 704 are activated during a cold state of the electronics. Local radiation shield 706 shields the electronics from radiation effects. The shielding material for the local radiation shield 706 may include graded-Z shielding with layers of aluminum, polyethylene, and tungsten to help protect the electronics from radiation effects such as electrostatic discharge (ESD), single-event effects (SEEs), and cumulative radiation damage. Local radiation shield 706 provides additional localized radiation shielding to compensate for typical structure of a cube satellite enclosure 604 which does not provide sufficient radiation and thermal protection required for the electronics on the printed circuit board 614 in the payload enclosure 606. Without the thermal system of the payload enclosure 606, the electronics would be exposed to a temperature range of around −30 to +100° C. in low-earth orbit, which is outside of operating conditions for electronics such as object detector 110 on the printed circuit board 614. With the active thermal and radiation structure for the payload enclosure 606, the electronics are exposed to a temperature range that may be reduced to −10 to +55° C. Also, the electronics exposure (such as object detector 110) to single-event effects from radiation may be reduced by 98%, from 120 events/year to 2 events/year, and the total ionizing dose may be reduced by 95%, from 20 krad to 1 krad over a 5 year mission (where the ionizing dose limit is between 2 to 10 krad to avoid damage to the electronics in the payload enclosure 606).

What is claimed is:

1. A host satellite that communicates with a client terminal, the host satellite comprising:
   a first memory segment to store a mission operation lookup table that has at least one mission operation identifier associated with mission parameter constraints, a target object type and object detection model parameters associated with the target object type;
   a first sensor to provide satellite sensor data that represents orbital mission characteristics;
   a second sensor to capture images, to define captured images;
   a mission operation selector responsive to the orbital mission characteristics and the mission parameter constraints to select the at least one mission operation identifier to define a selected mission operation identifier, wherein the mission operation selector dynamically selects the at least one mission operation identifier by comparing the orbital mission characteristic with the mission parameter constraints to determine when the orbital mission characteristics satisfy the mission parameter constraints;
   an object detector responsive to the captured images and the object detection model parameters associated with the selected mission operation identifier for detecting objects from the captured images wherein the object detector is dynamically configured with the object detection model parameters retrieved from the mission operation lookup table based on the selected operation identifier;
   an analytics generator responsive to the detected objects, the orbital mission characteristics, and the mission operation identifier to create a mission analytics packet; and

a communication interface to transfer the mission analytics packet to the client terminal.

2. The host satellite according to claim 1 wherein the analytics generator creates a mission analytics priority packet associated with the mission analytics packet; and wherein the analytics priority packet includes a mission packet identifier and mission priority characteristics.

3. The host satellite according to claim 2, further comprising:

a second memory segment to store a mission analytics lookup table that includes the analytics priority packet;

a third memory segment to store a mission analytics catalogue that includes the mission analytics packet;

a host satellite controller that provides a packet identifier request; and a packet identifier relay responsive to the packet identifier request to provide the at least one mission packet identifier to the host satellite controller;

wherein the host satellite controller is responsive to the mission packet identifier to select the mission analytics packet from the mission analytics catalogue.

4. The host satellite according to claim 3, wherein the orbital mission characteristics include satellite telemetry data that comprises at least one of a mission name, mission positioning, start time, end time, duration, operation dates, camera peripheral device data, satellite health, satellite status, satellite frequency of operations, captured image frame rate, captured image resolution, captured image time stamp, weather conditions, captured image analytics, inclination data, right ascension of ascending node data, eccentricity data, argument of perigee data, mean anomaly data, and mean motion data.

5. The host satellite of claim 4, wherein the first sensor comprises a global position system (GPS) antenna that provides a position signal, and an attitude control system; wherein the attitude control system provides the satellite telemetry data and provides an attitude pointing signal; and wherein the host satellite controller provides an attitude command signal based on at least one of the position signal, the attitude pointing signal, and the mission parameter constraints.

6. The host satellite of claim 5, wherein the attitude control system is responsive to the attitude command signal to point the host satellite in a direction associated with the mission parameter constraints; wherein the host satellite controller provides an image capture command responsive to the orbital mission characteristics and to the mission parameter constraints; and wherein the second sensor captures images responsive to the image capture command.

7. The host satellite of claim 6, wherein the mission operation selector, the analytics generator, the packet identifier relay, the orbital mission analytics controller, the object detector, the first memory segment, and the second memory segment are defined as an adaptive mission operation characterization system; and wherein the adaptive mission operation characterization system performs a tip and cue process to generate at least one of the attitude command signal and the image capture command based on the mission analytics packet.

8. The host satellite of claim 3, further comprising a satellite enclosure; and wherein the first memory segment, the first sensor, the second sensor, the mission operation selector, the object detector, the analytics generator, the communication interface, the second memory segment, the third memory segment, the host satellite controller, and the packet identifier relay are housed within the satellite enclosure to be defined as housed components; and wherein the satellite enclosure has a global thermal and radiation structure to protect the housed components.

9. The host satellite of claim 8, wherein the satellite enclosure further comprises at least one local thermal heat sink, at least one local thermal heater pad, and a local radiation shield.

10. The host satellite according to claim 1, wherein the at least one mission operation identifier is at least one application-specific mission operation.

11. The host satellite according to claim 10, wherein the target object type is associated with the at least one application-specific mission operation; and wherein the target object type comprises at least one of a methane leak, oil spill, wildfire, flood hazard, unauthorized fishing, unauthorized mining, unauthorized wood-cutting, railway system integrity, railways system malfunction, rendezvous and proximity operations and docking, orbital servicing, orbital refueling, orbital assembly, and orbital manufacturing.

12. The host satellite of claim 1, wherein the mission parameter constraints comprise at least one of satellite orbital location, region of interest, and time of day; and wherein the detected object includes an object classification associated with the target object type.

13. A method of generating and communicating orbital mission analytics from a host satellite in communication with a client terminal, the method comprising:

receiving a plurality of mission operation identifiers, each having a respective mission parameter constraint associated therewith;

providing at least one orbital mission characteristic;

providing at least one captured image;

comparing the at least one orbital mission characteristic with the plurality of mission operation identifiers and with the respective mission parameter;

selecting at least one of the plurality of mission operation identifiers;

dynamically configuring an object detector by loading the at least one object detection model parameter that associated with the at least one selected mission operation identifier into the object detector;

detecting at least one target object from the at least one captured image using the dynamically configured object detector, defined as at least one detected target object;

generating an orbital mission analytics packet based on the at least one detected target object, the at least one orbital mission characteristic, and the at least one mission operation identifier; and transferring the orbital mission analytics packet to the client terminal.

14. The method according to claim 13 further comprising:

selecting the at least one mission operation identifier from the plurality of mission operation identifiers.

15. The method according to claim 13, further comprising creating an analytics priority packet associated with the orbital mission analytics packet; wherein the analytics priority packet includes a mission packet identifier and at least one mission priority characteristic.

16. The method according to claim 13, wherein the at least one orbital mission characteristic includes satellite telemetry data that comprises at least one of a mission name, mission positioning, start time, end time, duration, operation dates, camera peripheral device data, satellite health, satellite status, satellite frequency of operations, captured image frame rate, captured image resolution, captured image time stamp, weather conditions, captured image analytics, inclination data, right ascension of ascending node data, eccentricity data, argument of perigee data, mean anomaly data, and mean motion data.

17. A method of communicating a mission analytics packet from a mission analytics packet catalog memory segment carried by a host satellite to a client terminal, the method comprising:

transmitting at least one command from the client terminal to the host satellite, wherein the at least one command provides a request instruction that comprises at least one of a mission packet identifier, a mission operation identifier, a detected object, an orbital mission characteristic, and a captured image;

storing a mission analytics packet catalog in the mission analytics packet catalog memory segment, wherein the mission analytics packet catalog includes a set of mission analytics packets associated with at least one of a set of orbital mission characteristics provided by a first sensor, a set of captured images provided by a second sensor, and a set of detected objects provided by an object detector, wherein the set of detected objects were detected using object detection model parameters that were dynamically loaded into the object detector based on selected mission operation identifiers;

analyzing the set of mission analytics packets to associate at least one mission analytics packet from the set of mission analytics packets with the request instruction;

selecting the at least one mission analytics packet associated with the request instruction; and transferring the selected at least one mission analytics packet to the client terminal.

18. The method according to claim 17, wherein the set of orbital mission characteristics are associated with satellite telemetry data that comprises at least one of a mission name, mission positioning, start time, end time, duration, operation dates, camera peripheral device data, satellite health, satellite status, satellite frequency of operations, captured image frame rate, captured image resolution, captured image time stamp, weather conditions, captured image analytics, inclination data, right ascension of ascending node data, eccentricity data, argument of perigee data, mean anomaly data, and mean motion data.

19. The method according to claim 17, wherein the detected object of the request instruction includes a target object type; and wherein the target object type comprises at least one of a methane leak, oil spill, wildfire, flood hazard, unauthorized fishing, unauthorized mining, unauthorized wood-cutting, railway system integrity, railways system malfunction, rendezvous and proximity operations and docking, orbital servicing, orbital refueling, orbital assembly, and orbital manufacturing.

20. The method according to claim 17, wherein the mission operation identifier is associated with mission parameter constraints; and wherein the mission parameter constraints include at least one of satellite orbital location, region of interest, and time of day.

* * * * *